United States Patent Office 3,551,483
Patented Dec. 29, 1970

3,551,483
2,4-DISULFONYL HALIDE SUBSTITUTED ACYLANILIDES
William M. McLamore, Kew Gardens, N.Y., and Gerald D. Laubach, Niantic, Conn., assignors to Chas. Pfizer & Co., Inc., New York, N.Y., a corporation of Delaware
No Drawing. Application Aug. 4, 1959, Ser. No. 831,462, now Patent No. 3,440,244, dated Apr. 22, 1969, which is a continuation-in-part of abandoned application Ser. No. 780,675, Dec. 16, 1958, which in turn is a continuation-in-part of application Ser. No. 715,482, Feb. 17, 1958, now Patent No. 3,110,716. Divided and this application Dec. 5, 1967, Ser. No. 703,811
Int. Cl. C07c *143/70*
U.S. Cl. 260—543
7 Claims

ABSTRACT OF THE DISCLOSURE

Novel 3,6 - disubstituted - 7 - sulfamylbenzo - 1,1 - dioxo - 1 - thia - 2,4 - diazines, their utility as diuretic agents and 5 - substituted - 2,4 - disulfamylacylanilide and 5 - substituted - 2,4 - disulfamylaniline intermediates for the same.

CROSS REFERENCE TO RELATED APPLICATIONS

This application is a division of application Ser. No. 831,462 filed Aug. 4, 1959 now Pat. No. 3,440,244 dated Apr. 22, 1969, said latter application being a continuation-in-part of now abandoned application Ser. No. 780,-675, filed Dec. 16, 1958, which in turn is a continuation-in-part of application Ser. No. 715,482, filed Feb. 17, 1958, and now issued as U.S. Pat. 3,110,716.

This invention is concerned with a new class of highly effective therapeutic agents as well as the method of preparing same. In particular, the therapeutic agents of this invention are 3,6-disubstituted-7-sulfamylbenzo-1,1-dioxo-1-thia-2,4-diazines which have proved to be valuable therapeutic agents. These compounds, hereinafter referred to as 3,6 - disubstituted - 7 - sulfamylbenzo - thiadiazine dioxides, and represented by the following formula:

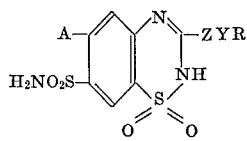

wherein A is selected from the group consisting of hydrogen, Cl F, Br, $NO_2$, $NH_2$, trifluoromethyl, and alkyl and alkoxy each containing from 1 to 3 carbon atoms; Z is an alkylene chain containing from 1 to 3 carbon atoms; Y is selected from the group consisting of S, SO and $SO_2$; R is selected from the group consisting of alkyl and alkenyl containing up to 12 carbon atoms and preferably up to 5 carbon atoms; cycloalkyl containing 4 to 6 carbon atoms; naphthyl;

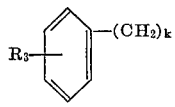

wherein $k$ is an integer from 0 to 4 and $R_3$ is selected from the group consisting of hydrogen, amino, lower alkylamino, nitro, fluoro, chloro, bromo, lower alkyl and lower alkoxy; W-$(CH_2)_q$— wherein $q$ is an integer from 0 to 3 and W is selected from the group consisting of thienyl, thiazolyl, pyrimidyl, pyridyl, furyl, imidazolyl and benzimidazolyl;

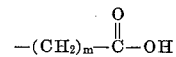

wherein $m$ is an integer from 1 to 5;

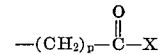

wherein $p$ is an integer from 0 to 5 and X is selected from the group consisting of —$NH_2$, —$NHR_1$, —$NHNH_2$, —$NHNHR_1$, and $OR_1$ wherein $R_1$ is selected from the group consisting of lower alkyl, phenyl and aralkyl containing 7 to 10 carbon atoms; and

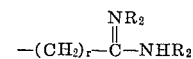

wherein $r$ is an integer from 0 to 5 and $R_2$ is selected from the group consisting of hydrogen, lower alkyl, phenyl and aralkyl containing 7 to 10 carbon atoms.

The alkylene radicals of which Z is representative are derived from aliphatic groups containing two unoccupied valences which permit them to be further connected as indicated for Z is the structural formula. Such radicals may be straight or branched and contain from 1 to 3 carbon atoms in their principal chain, that is, in the carbon chain between the two unoccupied valences. Preferred compounds are those in which Z contains one carbon atom in the principal chain and up to a total of 3 carbon atoms.

Although in the above formula reference is made to a preferred carbon content of the described alkanoyl, alkenylene and hydrocarbon substituents, 3,6-disubstituted-7-sulfamylbenzothiadiazine dioxides containing similar groups with higher carbon content may be employed. For example, the alkylene chain represented by Z may be of higher carbon content than indicated and may also be substituted with various groups, for example, phenyl, aralkyl and alkaryl, which, in turn may be substituted by such groups as halogen, nitro, alkoxy, amino and the like. However, the therapeutic activity of such compounds may tend to decrease. Further, since 3,6-disubstituted-7-sulfamylbenzothia-diazine dioxides containing alkanoyl, alkylene and hydrocarbon substituents of higher carbon content provide no appreciable advantage and the starting compounds for the production of said compounds are generally less economically advisable, they are not preferred. Oxygen analogs of the present new compounds, that is, compounds in which Y is oxygen, also possess the valuable therapeutic effectiveness herein described.

It is also intended to include within the scope of this invention the base addition salts of the above class of compounds as well as the acid addition salts of those compounds in which R contains a basic nitrogen, such as those in which R contains an amino group or a nitrogen heterocyclic ring. Particularly valuable are salts of acids containing a pharmacologically acceptable anion and bases containing a pharmalologically acceptable cation.

Of particular value because of their high order of activity as diuretic agents are compounds in which substituent A is chloro, methyl or trifluoromethyl.

The valuable new therapeutic agents of this invention may be prepared by a variety of synthetic routes which may be illustrated as follows:

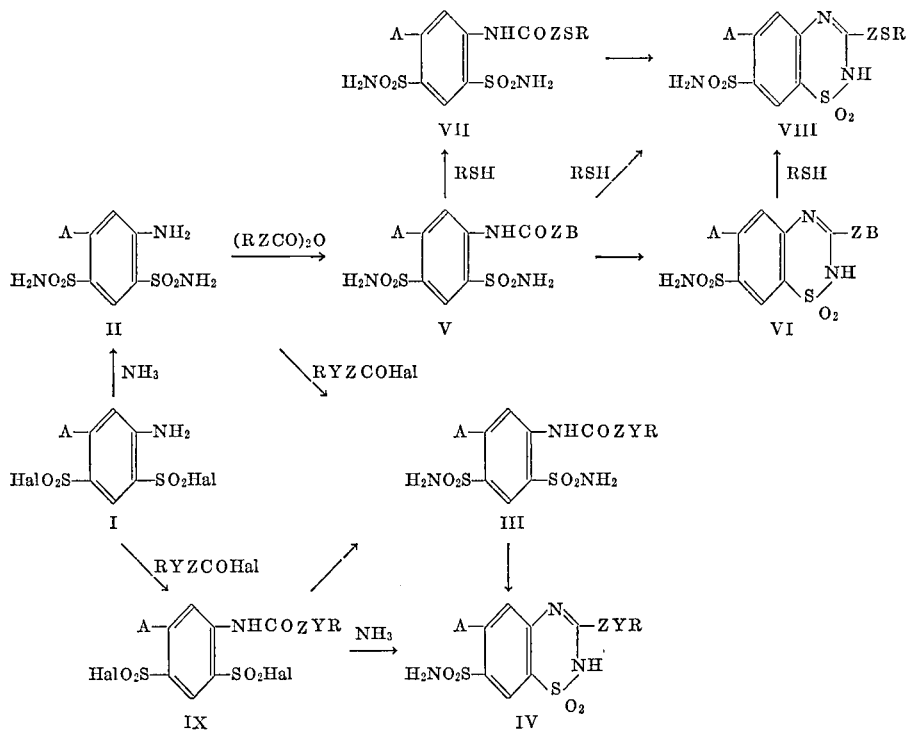

The ring closure reaction involving the production of compound IV from compound III, and compound VIII from compound VII, is brought out by merely contacting the starting compound with a base. Exemplary of suitable bases are inorganic bases such as alkali and alkaline earth metal oxides, carbonates and hydroxides, ammonium hydroxide and their obvious equivalents as well as organic bases such as tertiary amines like pyridine and preferably sterically-hindered tertiary amines, e.g. mono-, di- and tri-substituted pyridines such as 2,4,6-collidine, lutidine, 2-chloropyridine, 2,4-dichloropyridine and the like as well as hindered trialkylamines. Preferred tertiary amines are represented by the fomula:

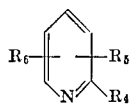

in which $R_4$ is selected fom the group consisting of chloro, bromo and alkyl containing up to 3 carbon atoms, and $R_5$ and $R_6$ are each selected from the group consisting of hydrogen, chloro, bromo and alkyl containing up to 3 carbon atoms. The reaction is carried in a reaction-inert solvent for best results. Such solvents are readily determined by routine experimentation and include water, lower alkanols, acetone, methyl ethyl ketone, dioxane, dimethylformamide, tetrahydrofuran and the like. The aforementioned liquid tertiary amine may also be used as solvent. By reaction-inert is meant solvents which do not react with the starting compounds under the conditions of the reaction. The inorganic base, preferably the hydroxides, may be used in the form of an aqueous solution generally containing from about 5% to about 20% by weight of hydroxide, although from about 5% to about 15% is preferred since best yields are obtained. Alternatively, solutions of the inorganic base in lower alkanols, e.g. methanol and ethanol, may be used. While the reaction proceeds satisfactorily in aqueous solution, the addition of a reaction-inert organic solvent materially facilitates production of the desired products by providing a more intimate contact of the reactants which have a somewhat limited solubility in water. Organic solvents useful in this regard are lower alkanols, dimethylformamide and similar lower-alkylated formamides, dioxane, tetrahydrofuran and the like. The quantity of base employed in the cyclization reaction does not appear to be critical, although it is generally preferred to employ at least an equimolar amount of base and starting compound. Smaller amounts of base may lead to reduced yields. Large excesses of base, say excesses up to 1000% and higher, may be utilized. As mentioned above, the amine may be used as solvent for the reaction.

Reaction temperature does not appear to be critical since a wide range of temperature may be used, for example, as low as 0° C. and as high as the reflux temperature of the mixture. The use of high temperature merely shortens the reaction time. It is generally found convenient to carry out this reaction at room temperature followed by a short period of heating at elevated temperature to ensure completeness of reaction. Although product formation is almost instantaneous, for best yields, the reaction is allowed to proceed for from about 1 to about 12 hours, depending on the quantities of reagents used. After the reaction is complete, the product is obtained by standard procedures. For example, solvent and excess amine, if used, may be removed by low pressure distillation and the product freed of residual amine by forming an alkali or alkaline earth metal salt which is water-soluble. The product is then obtained from the metal salt by conventional methods.

Alternatively the ring closure of the above described starting compounds may be effected by merely heating same. This is best accomplished by heating the acylanilide at its melting temperature. The liquefied acylanilide almost instantly transforms to the desired product as is evidenced by the solidification of the liquefied material within a few minutes of heating. The product is then purified by dissolving in aqueous solution of alkali metal carbonate, bicarbonate or hydroxide and precipitating with acid. Of course, this method of cyclization may lead to reduced yield of the desired product due to the formation of by-products particularly where extreme temperatures are employed, for which reason this method is not preferred.

The ring closure reaction involving the production of compound VI from compound V is brought about in the same way as the procedure for the ring closure of compounds IV and VIII to form the respective compounds III and VII with the exception that inorganic bases, particularly the hydroxides, should not be employed since their use may lead to the production of appreciable amounts of undesired by-products.

The acylation of compound II to produce compound III and compound I to produce compound IX is brought about by contacting the starting compound with an acyl halide of the formula:

RYZCOHal in which Halic halogen (bromo, iodo, fluoro and preferably chloro) and R, Y and Z are as described above. Alternatively, if desired, other equivalent amine acylating agents may be used in lieu of the acyl halide, e.g. the corresponding acid anhydride, mixed anhydride prepared with alkylchlorocarbonates such as methyl and ethyl chlorocarbonate; lower alkyl esters; carbodiimides, such as those of the formula: RYZCON-C-NCOZYR ; and even the corresponding acid RYZCOOH.

The reaction is generally effected by merely contacting the selected acyl halide with the starting compound in at least a 1:1 molar ratio. Excess of the acyl halide, up to about 20%, is found to enhance the yield of product. The reaction is preferably carried out in a reaction-inert organic solvent, e.g. methyl ethyl ketone, acetone, dioxane, lower alkyl esters of ethylene glycol and diethylene glycol, such as the dimethyl ether of diethylene glycol (diglyme) and of ethylene glycol (monoglyme). A particularly effective solvent is monoglyme, the use of which leads to excellent yields of the desired product. While not essential, hydrogen halide acceptors may be used in this process. Hydrogen halide acceptors are well known to those skilled in the art, for example, organic amine, such as pyridine, triethylamine, etc., inorganic bases, such as alkali and alkaline earth metal hydroxides and carbonates or their obvious equivalents and the like. Temperature does not appear to be critical in this reaction, a wide range of temperature being found operable, from 0° C. to the reflux temperature of the reaction mixture. The use of high temperature merely shortens the time of reaction. Generally, time periods of from 1 to about 12 hours, and even longer, may be used depending on the temperature used.

Because of the difficulty of preparing suitable acyl halides, RYZCOSal, the compounds in which R contains a functional group including nitrogen are preferably not prepared by this procedure.

Compound III structures in which R is:

$(CH_2)_pCOX$, wherein $p$ is an integer from 0 to 5 and X is selected from the group consisting of $-NH_2$, $-NHNH_2$, $NHNHR_1$, and $NHR_1$, wherein $R_1$ has the meaning defined herein; and

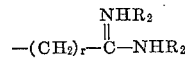

wherein $r$ and $R_2$ have the meaning defined herein; are prepared by reaction of the corresponding mercaptan RSH with a suitable (halo) acylanilide of the structure of compound V. The reaction is carried out in the presence of a substantially equimolar amount of a base, as hereinbefore described. Preferred bases are tertiary amines, as described herein, and alkali (Na, K, Li) or alkaline earth (Ba, Ca, Sr) metal carbonates and bicarbonates since their use leads to excellent yields of desired product. The reaction is advantageously carried out in a reaction-inert organic solvent for the reactants. When the base employed is inorganic, it is usually preferred to use water as reaction solvent to which suitable organic solvents may be added if desired. After reaction is complete, the product is obtained by conventional procedure. Compound IX structures in which R includes a functional group containing nitrogen, as above described in this paragraph, are not prepared by even this procedure due to the interfering sulfonyl halide groups of the aniline compound.

The condensation of a mercaptan (RSH) with compounds V or VI to form compound VIII, and with compound V to form compound VII is carried out in the presence of a base either inorganic or organic, as hereinbefore described. The conversion of compound V to VII is carried out in the presence of one equivalent of base, while the other conversions may be effected in the presence of at least an equivalent amount, and usually in the presence of excess base. Large excesses of base have been used without materially reducing the yield of final product. The condensation is usually carried out in a reaction inert solvent, usually water when an inorganic base is employed. A variety of other such solvents may be employed, either alone or in combination with water. While the reactions proceeds satisfactorily in aqueous solution, the addition of an organic solvent materially facilitates production of desired compounds by providing a more intimate contact of the reactants which have a limited solubility in water. Organic solvents suitable for these ends are ketones such as acetone and ethyl methyl ketone, lower alkanols, such as methanol, ethanol and the propanols, dimethylformamide and similar lower-alkylated formamides, dioxane, tetrahydrofuran and the like.

Although an equimolar ratio of reactants is found to yield appreciable amounts of product, it is generally preferred to employ excess mercaptan to obtain best yields. Excesses of up to 40 mole-percent are found particularly suitable, while larger excesses, although operable, provide no appreciable advantage.

The reaction is carried out at temperature of from about 0° C. to about reflux temperature of the reaction mixture, and preferably between 20° and 120° C., for from about 1 to about 12 hours. Heating at higher temperatures and for longer periods of time may lead to reduced yield of the desired product.

After the reaction is complete, the product may be obtained by conventional procedures such as concentration of the reaction mixture. When an inorganic base is employed, the product is obtained by acidification of the resultant metal salt. The product may be recrystallized from appropriate solvents, such as acetone, lower alkanols, acetone-ether mixtures, acetone-alkanol mixtures and the like.

The ammonolysis reaction for the preparation of compound IV from compound IX (where Hal is halogen) is accomplished by treating the starting compound with aqueous ammonia, which effects the ammonolysis of the sulfonyl halide groups and ring closure to compound IV. Reaction temperature does not appear to be critical since the reaction takes place over a wide range of temperature, even as low as 0° C. and lower. The use of elevated temperature (up to about 100° C.) merely serves to shorten the reaction time. Although an equivalent molar ratio of ammonia may be employed, it is generally preferred to use large excesses of ammonia, particularly if elevated temperature is used, for obvious reasons. Reaction periods of from about 1 to about 8 hours, depending on the temperature, are found to give good yield of product. After the reaction is complete, the product is obtained by acidificataion of the reaction mixture and filtration. Recrystallization of the product may be carried out as previously described.

The ammonolysis of compound IX to produce compound III is carried out by any of the standard procedures of converting a sulfonyl halide to the corresponding sulfonamide. For example, the bis sulfonyl halide starting compound may be treated with gaseous ammonia, liquid ammonia, solutions of ammonia in substantially dry organic solvents, such as butanol, methanol, ethanol, benzene, and the like. The reaction mixture should be substantially free of water to prevent formataion of compounds of compound IV. The presence of minor amounts of water does not seriously impede the production of the desired product. It is usually preferred to keep the water concentration below about 2% and preferably below 1% based on the reaction mixture volume. After the initial vigorous reaction subsides, the reaction mixture may be heated at elevated temperature to ensure completeness of reaction. The product is then obtained by standard procedures as previously described.

The reaction is almost instantaneous on mixing the reactants. Temperature is not critical, although it usually is preferred to use low temperature, say room temperature and even lower to 0° C., since the initial reaction may be quite vigorous.

The ammonolysis of compound I to produce compound II is carried out by any of the standard procedures of preparing sulfonamides from corresponding sulfonyl halides as described in the previous paragraph. Of course, aqueous ammonia may also be used in this process.

The acylation of compound II to produce compound V may be effected in the usual way, employing an acylating derivative of an acid of the formula:

BZCOOH wherein B and Z are as previously described for example, the acid halide, lower alkyl ester, mixed anhydride with lower alkyl chlorocarbonates, carbodiimides and preferably, the acid anhydride:

(BZCO)$_2$O

The reaction is generally effected by heating a mixture of the selected haloacid anhydride with a 5-substituted-2,4-disulfamylaniline at a temperature of from about 60° to about 100° C. Usually a reaction time of from about ½ to about 3 hours is found to give excellent yield of the desired product. Heating for longer periods of time may result in decreased yield. Generally, a 1:1 molar ratio of the reactants may be employed. It is preferred to employ a large excess, for example, from 100 to 300% molar excess, of the selected acid anhydride since shorter reaction times are realized in so doing. Intimate mixing of the reactants while heating is found particularly helpful, although not essential, since an excellent yield of the product is obtained. During the course of the reaction, it is at time found helpful to add a solvent, particularly if the reaction mixture should solidify, thus necessitating prolonged heating which may lead to reduced yield of the product. Liquid halogenated hydrocarbons, for example, chloroform, are found to be particularly suitable solvents. After the reaction is complete, the reaction mixture is treated with water to hydrolyze unreacted anhydrides. The solid residue may be crystallized from acetone to give the desired 5-substituted-2,4-disulfamyl(halo)acylanilide.

Additional preparative methods for the preparation of the present new products suggest themselves to one skilled in the art. For example, compound IV products in which Y is SO or SO$_2$ may be prepared from those in which Y is S.

The conversion of the present therapeutic agents in which Y is S to those in which Y is SO or SO$_2$ is effected by reaction with a suitable oxidizing agent. A preferred oxidizing agent is hydrogen peroxide in aqueous solution generally employed at concentrations of from about 30% to 40% by weight although higher or lower percentages of hydrogen peroxide are operable. Alkali metal permanganates may also be employed as oxidizing agent but their use may lead to lower yields of the desired product. The reaction may be conveniently carried out in a solvent such as lower alkanoic acids for example, acetic acid. Other water miscible solvents may be advantageously employed in this oxidation process for example, lower alkanols such as ethanol, methanol, propanol or ketones such as acetone or ethyl methyl ketone. These compounds are prepared employing at least stoichiometric amounts of hydrogen peroxide. Because of its tendency to decompose, it is found advisable to employ excess hydrogen peroxide. Of course, as is known to those skilled in the art, extremely large excesses of the oxidizing agent should be avoided in preparing the present compounds in which Y is SO to minimize the coproduction of those in which Y is SO$_2$. A particularly convenient method of preparation of the former is to react the substrate with about a 100% excess of hydrogen peroxide at room temperature (20–30° C.) although lower temperatures may be employed for example, temperatures as low as 0° C. The use of higher temperatures may appreciably reduce the yield of the desired product and hence are preferably avoided. The preparation of those compounds in which Y is SO$_2$ may be conveniently carried out by employing a large excess of peroxide, say from 200% to 400% excess and even higher. Heating the reaction mixture is particularly helpful since it materially shortens the reaction time and ensures complete conversion. As is obvious, these latter compounds may also be prepared from those in which Y is SO, which constitute an intermediate stage of oxidation. After the reaction is complete, the product is obtained by conventional procedures for example, concentration and precipitation. Of course, it is obvious that peracids, e.g. peracetic acid, perbenzoic acid, or the like may be used in place of hydrogen peroxide in this process.

The therapeutic agents of this invention in which R is other than (CH$_2$)$_m$COOH or (CH$_2$)$_p$COX, as hereindescribed, are effective diuretic agents. In addition to their use as intermediates in the preparation of the final products, compounds VII, VI, V and III in which R is other than (CH$_2$)$_m$COOH or (CH$_2$)$_p$COX as hereindescribed are also effective diuretic agents, especially those represented by compounds VI and VII. These compounds also form base salts as do the hereinbefore described products with both pharmaceutically-acceptable and unacceptable cations which have essentially the same utility as described herein. Those compounds in which R is (CH$_2$)$_p$COX, wherein "$p$" is as described above and X is —NH$_2$, —NHR$_1$, —NHNH$_2$ or —NHNHR$_1$ are effective hypotensive agents. Of course, hypotensive agents are used for the lowering of blood pressure in humans. The present agents may be used alone or in combination with other therapeutic agents according to standard medical practice. The compounds in which R is (CH$_2$)$_m$COOH or (CH$_2$)$_p$COOR$_1$ are intermediates for the preparation of the present hypotensive agents.

The ideal diuretic agent should principally have an enhancing effect on salt as well as water excretion. Additionally, it should maintain a sustained electrolyte balance of body fluids, for example, maintain normal pH values, normal potassium and bicarbonate levels and effect an equivalent excretion of sodium and chloride ions on a sustained basis. Further, a diuretic agent should have a continued effectiveness during daily administration for protracted periods of time. Many diuretics of the prior art are limited in therapeutic application since they do not possess all of the above described properties. Some cause metabolic acidosis by increasing urinary pH; others cause increased potassium and bicarbonate ion elimination and no increase in chloride elimination. Many diuretics are not readily tolerated in prolonged therapy. Some diuretics initially possess many of these properties but in prolonged application either rapidly lose their desired effects or demonstrate a lack of continuous effective action particularly in salt elimination. Because the use of these diuretics in therapy results in a number of undesirable effects, they have only limited application since they may be used only in seriously restricted conditions. Generally certain diuretics are used in combination with other diuretics so that the combination possesses an appreciable number of the above described properties.

The therapeutic agents of the present invention which have diuretic activity possess a number of the properties of an ideal diuretic which makes them valuable compounds for therapeutic application.

The therapeutic agents of this invention may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes— for example, enough saline or glucose to make the solution isotonic.

The physician will determine the dosage of the present therapeutic agents which will be most suitable and it will vary with the form of administration and the particular compound chosen, and furthermore, it will vary with the particular patient under treatment. He will generally wish to initiate treatment with small dosages substantially less than the optimum dose of the compound and increase the dosage by small increments until the optimum effect under the circumstances is reached. It will generally be found that when the composition is administered orally, larger quantities of the active agent will be required to produce the same effect as a smaller quantity given parenterally. The compounds are useful in the same manner as other diuretics or hypotensive agents and the dosage level is of the same order of magnitude as is generally employed with these other therapeutic agents. The therapeutic dosage will generally be about 100 to 500 milligrams per day although it may be administered in several different dosage units. Tablets containing from 25 to 250 mg. of active agent are particularly useful.

In the foregoing, reference is made to pharmacologically acceptable anions and cations. Examples of a pharmacologically acceptable anion are iodide, chloride, bromide, sulfate, methylsulfate, acetate, propionate, tartrate, citrate, gluconate, and so forth. The term, "pharmacologically acceptable anion" has a definite meaning to one skilled in the art. It is defined as non-toxic anion of any of the simple acids commonly used is pharmacology to neutralize basic medicinal agents when the salt thereof is to be used therapeutically. The pharmacological activity of the molecule is primarily a function of the cation, the anion serving chiefly to supply electrical neutrality. "Pharmacologically acceptable cations" also have a definite meaning to one skilled in the art. It is defined as a non-toxic cation of basic compounds commonly used in pharmacology to neutralized acid medicinal agents when the salt thereof is to be used therapeutically. The pharmacological activity of the molecule is primarily a function of the anion, the cation serving chiefly to supply electrical neutrality. Commonly employed pharmacologically acceptable cations are, for example, sodium, potassium calcium and magnesium. These acid and base addition salts of the compounds of the present invention may be prepared employing conventional procedures. One such procedure involves treating the subject compounds with an aqueous solution containing an equivalent amount of the reagents, i.e. the pharmacologically acceptable base, followed by concentration of the resultant mixture to obtain the desired product. Pharmacologically acceptable acids are those which contain the anions described above. Pharmacologically acceptable bases are those which contain the cations described above. Such bases may be, for example, oxides, hydroxides, carbonates or bicarbonates. Of course, salts formed with pharmacologically unacceptable acids or bases, while not useful therapeutically, may be used in the purification of the present therapeutic agents and also in the preparation of the pharmacologically acceptable salts.

The above described 5 - substituted - 2,4-disulfamyl-aniline and 5-substituted aniline bis sulfonyl halides may be prepared by procedures described in the literature, for example, the general procedure described in Monatsch. Chem., vol. 48, p. 87 (1927) which involves the treatment of a meta-substituted aniline with from 10 to 20 parts by weight of chlorosulfonic acid followed by the gradual addition of from about 90 to 170 parts by weight of sodium chloride. The resultant mixture is heated at approximately 150° C. for about 2 hours after which the reaction mixture is poured into water and the resultant 5-substituted aniline-2,4-disulfonyl chloride is filtered and is then treated with concentrated ammonium hydroxide by standard procedures to obtain the corresponding disulfonamide. The meta-substituted anilines, for example, meta-chloro-, meta-fluoro, meta-bromo, meta-nitro, meta - alkanoyl, meta-alkyl, meta - trifluoromethyl and meta-alkoxy anilines, may be readily obtained or prepared by standard procedures known to one skilled in the art. The haloacid anhydride may be prepared by conventional procedures, for example, heating the corresponding haloacid in excess acetic anhydride, followed by removal of the acetic anhydride-acetic acid mixture so formed leaving the desired haloacid anyhdride. The above procedure is commonly employed in the art. Alternatively, the anhydride may be prepared by sublimation in vacuo of the corresponding haloacid. Further, such anhydrides may be prepared by the interaction of the sodium salt of the selected haloacid and the corresponding haloacylhalide, a well known procedure. The herein-described substituted mercaptoacyl halides are prepared by known procedures, e.g. reaction of the corresponding acid with thionyl chloride.

The following examples are given by way of illustration and are not to be construed as limitations of this invention, many variations of which are possible without departing from the scope and spirit thereof.

EXAMPLE I 3-benzylthiomethyl - 6-chloro - 7-sulfamyl - 1,2,4-benzothiadiazine-1,1-dioxide Method A: A mixture of 7.24 g. (0.02 mole) of 5-chloro-2,4-disulfamyl (α-chloro) acetanilide and 2.98 g. (0.024 mole) benzylmercaptan in 20 ml. of 10% sodium hydroxide to which is added 20 ml. of dimethylformamide is stirred at room temperature for 8 hours. The mixture is then heated for 10 minutes on a steam bath, cooled and acidified with 6 N HCl. The precipitate which forms is filtered and recrystallized from acetone. The product melts at 231–232° C. Elemental analysis gives the following results:

Calculated for $C_{15}H_{14}N_3O_4S_3Cl$ (percent): C, 41.71; H, 3.3; N, 9.7. Found (percent): C, 41.2; H, 3.3.

Method B: A mixture of 3-chloromethyl-6-chloro-7-sulfamylbenzothiadiazine-1,1-dioxide (0.02 mole) and benzylmercaptan (0.024 mole) in 20 ml. of 10% sodium hydroxide and 20 ml. of dimethylformamide is stirred at room temperature for 6 hours. After heating for 10 minutes on a steam bath, the mixture is cooled and acidified with 6 N HCl to obtain the product.

Method C: A mixture of 24 g. of 5-chloro-2,4-disulfamyl(S-benzyl)thioglycolanilide in 192 ml. of methanol and 60 ml. of 7% aqueous sodium hydroxide is stirred for 12 hours after which the mixture is heated on a steam bath for one hour. The mixture, after cooling, is poured into 6 N hydrochloric acid and the resulting precipitate filtered, washed with water and dried to obtain the product.

Method D: Five grams of N-(S-benzylthioglycollyl)-5-chloroaniline-2,4-bis (sulfonyl chloride) in 50 ml. of concentrated ammonium hydroxide is allowed to stand at room temperature for 12 hours. After stripping excess ammonia, the solution is acidified with 6 N hydrochloric acid to obtain the product which is filtered, washed with water and dried.

EXAMPLE II 3-benzylsulfinylmethyl - 6-chloro - 7-sulfamyl - 1,2,4-benzothiadiazine-1-1-dioxide The product of Example I (3.5 g.) is dissolved in 25 ml. of acetone and the mixture treated with 2.5 ml. of 30% aqueous hydrogen peroxide in 10 ml. glacial acetic acid. The mixture is stirred for 7 hours and allowed to stand for 8 hours. The crystalline precipitate which forms is filtered, washed with acetone and then water and dried. Recrystallization from methanol-acetone gives a product melting at 225° C. Elemental analysis gives the following results:

Calculated for $C_{15}H_{14}N_3O_5S_3Cl$ (percent): C, 40.22; H, 3.15; N, 9.38. Found (percent): C, 40.1; H, 3.1; N, 9.1.

This product is also prepared by Methods C and D of Example I from corresponding N-(benzylsulfinylacetyl)aniline derivative.

EXAMPLE III 3-benzylsulfonylmethyl - 6-chloro - 7-sulfamyl - 1,2,4-benzothiadiazine-1,1-dioxide 3.5 grams of the product of Example I is dissolved in 25 ml. of acetone and the mixture treated with 5.0 ml. of 30% aqueous hydrogen peroxide in 20 ml. of glacial acetic acid. The resultant mixture is heated on a steam bath for 4 hours after which the product is obtained by concentration. Recrystallization from methanol-acetone gives a product melting at 299–300° C. (d.). Elemental analysis gives the following results:

Calculated for $C_{15}H_{14}N_3O_6S_3Cl$ (percent): C, 38.83; H, 3.04; N, 9.06. Found (percent): C, 38.36; H, 3.03; N, 8.80.

This product is also prepared by Methods C and D of Example I from the corresponding N-(benzylsulfonylacetyl)aniline derivative.

EXAMPLE IV 3-dodecylthiomethyl - 6-chloro - 7-sulfamyl - 1,2,4 - benzothiadiazine-1,1-dioxide The compound is prepared using Method A of Example I from dodecylmercaptan and 5-chloro-2,4-disulfamyl (α-chloro)acetanilide. The product melts at 256.5–257° C. Elemental analysis agrees with the theoretical values.

EXAMPLE V 3-carboxymethylthiomethyl - 6-chloro - 7-sulfamyl - 1,2,4-benzothiadiazine-1,1-dioxide This compound is prepared by Method A of Example I from thioglycollic acid and 5-chloro-2,4-disulfamyl (α-chloro)acetanilide. The product melts at 236–237° C. (d.). Elemental analysis agrees with the theoretical values.

EXAMPLE VI 3-ethylthiomethyl - 6-chloro-7 - sulfamyl - 1,2,4 - benzothiadiazine-1,1-dioxide This compound is prepared by Method A of Example I from ethylmercaptan and 5-chloro-2,4-disulfamyl (α-chloro)acetanilide. The product melts at 264–265° C. (d.). Elemental analysis agrees with the theoretical values.

EXAMPLE VII 3-carboxyethylthiomethyl-6-chloro-7-sulfamyl-1,2,4-benzothiadiazine-1,1-dioxide This compound is prepared according to Method A of Example I from β-mercaptopropionic acid and 5-chloro-2,4-disulfamyl (α-chloro)acetanilide. The product melts at 218–219° C. Elemental analysis agrees with the theoretical values.

EXAMPLE VIII 3-p-tolythiomethyl-6-chloro-7-sulfamyl-1,2,4-benzothiadiazine-1,1-dioxide This compound is prepared according to Method A of Example I from p-tolymercaptan and 5-chloro-2,4-disulfamyl (α-chloro)acetanilide. The product melts at 259–260° C. Elemental analysis agrees with the theoretical values.

EXAMPLE IX

The following compounds are prepared according to the procedures of Example I from corresponding starting compounds:

3-allylthiomethyl-6-chloro-7-sulfamyl-1,2,4-benzothiadiazine-1,1-dioxide (m. 222.5–223° C.)
3-n-butylthiomethyl-6-chloro-7-sulfamyl-1,2,4-benzothiadiazine-1,1-dioxide (m. 243–244° C.)
3-methallylthiomethyl-6-chloro-7-sulfamyl-1,2,4-benzothiadiazine-1,1-dioxide (m. 228–230° C.)
3-benzylthiomethyl-6-methyl-7-sulfamyl-1,2,4-benzothiadiazine-1,1-dioxide (m. 236–237° C.)
3-(3-thienylthiomethyl)-6-chloro-7-sulfamyl-1,2,4-benzothiadiazine-1,1-dioxide (m. 268–269° C.)
3-(p-methoxybenzylthiomethyl)-6-chloro-7-sulfamyl-1,2,4-benzothiadiazine-1,1-dioxide (m. 251–252.5° C.)
3-(p-fluorobenzylthiomethyl)-6-chloro-7-sulfamyl-1,2,4-benzothiadiazine-1,1-dioxide (m. 244–245° C.)
3-[1-(benzylthio)ethyl]-6-chloro-7-sulfamyl-1,2,4-benzothiadiazine-1,1-dioxide (m. 232.5–233.5° C.)
3-furfurylthiomethyl-6-chloro-7-sulfamyl-1,2,4-benzothiadiazine-1,1-dioxide (m. 202–203° C.)
3-(p-hydroxybenzylthiomethyl)-6-chloro-7-sulfamyl-1,2,4-benzothiadiazine-1,1-dioxide (m. 252–254° C.)
3-(3-methoxy-4-hydroxybenzylthiomethyl)-6-chloro-7-sulfamyl-1,2,4-benzothiadiazine-1,1-dioxide (m. 224.5–225° C.)
3-(p-dimethylaminobenzylthiomethyl)-6-chloro-7-sulfamyl-1,2,4-benzothiadiazine-1,1-dioxide (m. 213.5–214° C.)
3-(2-thenylthiomethyl)-6-chloro-7-sulfamyl-1,2,4-benzothiadiazine-1,1-dioxide (m. 237–238° C.)
3-(3-thenylthiomethyl)-6-chloro-7-sulfamyl-1,2,4-benzothiadiazine-1,1-dioxide (m. 213–214° C.)

The products of Examples IV–IX are oxidized according to the procedure of Example II to the following sulfoxides:

3-dodecylsulfinylmethyl-6-chloro-7-sulfamyl-1,2,4-benzothiadiazine-1,1-dioxide
3-carboxymethylsulfinylmethyl-6-chloro-7-sulfamyl-1,2,4-benzothiadiazine-1,1-dioxide
3-ethylsulfinylmethyl-6-chloro-7-sulfamyl-1,2,4-benzothiadiazine-1,1-dioxide
3-p-tolysulfinylmethyl-6-chloro-7-sulfamyl-1,2,4-benzothiadiazine-1,1-dioxide 3-allylsulfinylmethyl-6-chloro-7-sulfamyl-1,2,4-benzo-
   thiadiazine-1,1-dioxide
3-n-butylsulfinylmethyl-6-chloro-7-sulfamyl-1,2,4-benzo-
   thiadiazine-1,1-dioxide
3-methallylsulfinylmethyl-6-chloro-7-sulfamyl-1,2,4-
   benzothiadiazine-1,1-dioxide
3-benzylsulfinylmethyl-6-methyl-7-sulfamyl-1,2,4-benzo-
   thiadiazine-1,1-dioxide
3-(3-thienylsulfinylmethyl)-6-chloro-7-sulfamyl-1,2,4-
   benzothiadiazine-1,1-dioxide
3-(p-methoxybenzylsulfinylmethyl)-6-chloro-7-sulfamyl-
   1,2,4-benzothiadiazine-1,1-dioxide
3-(p-fluorobenzylsulfinylmethyl)-6-chloro-7-sulfamyl-
   1,2,4-benzothiadiazine-1,1-dioxide
3-[1-(benzylsulfinyl)ethyl]-6-chloro-7-sulfamyl-1,2,4-
   benzothiazine-1,1-dioxide
3-furfurylsulfinylmethyl-6-chloro-7-sulfamyl-1,2,4-
   benzothiadiazine-1,1-dioxide
3-(3-methoxy-4-hydroxybenzylsulfinylmethyl)-6-chloro-7-
   sulfamyl-1,2,4-benzothiadiazine-1,1-dioxide
3-(p-dimethylaminobenzylsulfinylmethyl)-6-chloro-7-sul-
   famyl-1,2,4-benzothiadiazine-1,1-dioxide
3-(2-thenylsulfinylmethyl)-6-chloro-7-sulfamyl-1,2,4-
   benzothiadiazine-1,1-dioxide
3-(3-thenylsulfinylmethyl)-6-chloro-7-sulfamyl-1,2,4-
   benzothiadiazine-1,1-dioxide Employing the procedure of Example III, the products of Examples IV–IX are oxidized to the following sulfones:

3-dodecylsulfonylmethyl-6-chloro-7-sulfamyl-1,2,4-benzo-
   thiadiazine-1,1-dioxide
3-carboxymethylsulfonylmethyl-6-chloro-7-sulfamyl-
   1,2,4-benzothiadiazine-1,1-dioxide
3-ethylsulfonylmethyl-6-chloro-7-sulfamyl-1,2,4-benzo-
   thiadiazine-1,1-dioxide
3-carboxyethylsulfonylmethyl-6-chloro-7-sulfamyl-1,2,4-
   benzothiadiazine-1,1-dioxide
3-p-tolysulfonylmethyl-6-chloro-7-sulfamyl-1,2,4-benzo-
   thiadiazine-1,1-dioxide
3-allylsulfonylmethyl-6-chloro-7-sulfamyl-1,2,4-benzo-
   thiadiazine-1,1-dioxide
3-n-butylsulfonylmethyl-6-chloro-7-sulfamyl-1,2,4-benzo-
   thiadiazine-1,1-dioxide
3-methallylsulfonylmethyl-6-chloro-7-sulfamyl-1,2,4-
   benzothiadiazine-1,1-dioxide
3-benzylsulfonylmethyl-6-methyl-7-sulfamyl-1,2,4-benzo-
   thiadiazine-1,1-dioxide
3-(3-thienylsulfonylmethyl)-6-chloro-7-sulfamyl-1,2,4-
   benzothiadiazine-1,1-dioxide
3-(p-methoxybenzylsulfonylmethyl)-6-chloro-7-sulfamyl-
   1,2,4-benzothiadiazine-1,1-dioxide
3-(p-fluorobenzylsulfonylmethyl)-6-chloro-7-sulfamyl-
   1,2,4-benzothiadiazine-1,1-dioxide
3-[1-(benzylsulfonyl)ethyl]-6-chloro-7-sulfamyl-1,2,4-
   benzothiadiazine-1,1-dioxide
3-furfurylsulfonylmethyl-6-chloro-7-sulfamyl-1,2,4-
   benzothiadiazine-1,1-dioxide
3-(3-methoxy-4-hydroxybenzylsulfonylmethyl)-6-chloro-
   7-sulfamyl-1,2,4-benzothiadiazine-1,1-dioxide
3-(p-dimethylaminobenzylsulfonylmethyl)-6-chloro-7-
   sulfamyl-1,2,4-benzothiadiazine-1,1-dioxide
3-(2-thenylsulfonylmethyl)-6-chloro-7-sulfamyl-1,2,4-
   benzothiadiazine-1,1-dioxide
3-(3-thenylsulfonylmethyl)-6-chloro-7-sulfamyl-1,2,4-
   benzothiadiazine-1,1-dioxide

EXAMPLE X

Additional 3,6-disubstituted-benzothiadiazine dioxides of the following formulas, as well as the corresponding sulfoxides and sulfones, are prepared according to the procedure of the above examples.

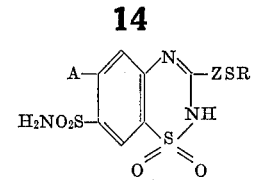

TABLE I

| A | Z | R |
|---|---|---|
| Cl | $CH_2$ | $CH_3$ |
| Cl | $CH_2$ | $C_6H_5(CH_2)_4$ |
| F | $(CH_2)_2$ | $C_{12}H_{25}$ |
| $CH_3$ | $CH_2$ | $C_6H_{13}$ |
| n-$C_3H_7$ | $(CH_2)_2$ | $C_4H_9$ |
| H | $CH_2$ | $C_6H_5CH_2$ |
| H | $CH_2$ | $CH_3$ |
| $OC_3H_7$ | $CH_2$ | $C_6H_5(CH_2)_2$ |
| $CF_3$ | $(CH_2)_3$ | $C_6H_5$ |
| $CF_3$ | $CH_2$ | $CH_3C_6H_4$ |
| i-$C_3H_7$ | $CH_2$ | $C_3H_7C_6H_4$ |
| $CH_3$ | $(CH_2)_2$ | $C_4H_9C_6H_4$ |
| Br | $CH_2$ | $C_{10}H_7$ |
| $NO_2$ | $(CH_2)_3$ | Allyl |
| $CH_3$ | $(CH_2)_2$ | Dodecenyl |
| $OC_2H_5$ | $(CH_2)_2$ | Hexenyl |
| Cl | $(CH_2)_3$ | Butenyl |
| $OCH_3$ | $(CH_2)_2$ | $(CH_3)_2C_6H_3$ |
| Br | $(CH_2)_3$ | $CH_3C_6H_4CH_2$ |
| $CH_3$ | $CH_2$ | $NO_2C_6H_4$ |
| $OCH_3$ | $CH_2$ | $NO_2C_6H_4CH_2$ |
| Br | $CH_2$ | $CH_3OC_6H_4$ |
| $NO_2$ | $CH_2$ | $BrC_6H_4$ |
| $NO_2$ | $CH_2$ | $ClC_6H_4CH_2$ |
| Cl | $CH_2$ | $CH_2(CH_2)_4COOH$ |
| $CF_3$ | $CH_2$ | $CH_2CH_2COOH$ |
| $CF_3$ | $CH_2$ | $CH_2(CH_2)_4COOCH_3$ |
| H | $(CH_2)_2$ | $CH_2CH_2COOH$ |
| Cl | $CH_2$ | $CH_2COOC_2H_5$ |
| Cl | $CH_2$ | $CH_2COOC_3H_7$ |
| Br | $CH_2$ | $C_3H_7OC_6H_4$ |
| $CH_3$ | $CH_2$ | $FC_6H_4(CH_2)_4$ |
| Cl | $CH_2$ | $NH_2C_6H_4$ |
| Cl | $CH_2$ | $(CH_3)_2NC_6H_4$ |
| Cl | $CH_2$ | $NH_2C_6H_4CH_2$ |
| Cl | $CH_2$ | $C_3H_7NHC_6H_4$ |
| $CH_3$ | $CH_2$ | $(C_2H_5)_2NC_6H_4CH_2$ |
| $CF_3$ | $CH_2$ | $CH_3NHC_6H_4(CH_2)_4$ |
| Cl | $CH_2$ | Allyl |
| Cl | $CH_2$ | Cyclohexyl |
| Cl | $CH_2$ | Cyclopentyl |
| Cl | $CH_2$ | Cyclobutyl |
| Cl | $CH_2$ | 3-thienyl |
| Cl | $CH_2$ | Thiazolyl |
| Cl | $CH_2$ | Pyrimidyl |
| Cl | $CH_2$ | Pyridyl |
| Br | $CH_2$ | Pyrimidyl |
| Cl | $CH_2$ | Furfuryl |
| Cl | $CH_2$ | Picolyl |
| $NO_2$ | $CH_2$ | Thienylethyl |
| $CH_3$ | $CH_2$ | Pyridylpropyl |
| $OCH_3$ | $CH_2$ | Furylpropyl |
| $NO_2$ | $(CH_2)_3$ | Thienyl |
| H | $(CH_2)_2$ | Furfuryl |
| Cl | $CH(CH_3)$ | Methallyl |
| $CH_3$ | $CH(CH_3)$ | $C_6H_5CH_2$ |
| $CF_3$ | $CH(CH_3)$ | Allyl |
| Cl | $CH(CH_3)CH_2$ | $C_6H_5CH_2$ |
| Cl | $CH(C_2H_5)$ | Allyl |
| Cl | $CF_2$ | $2,4-(OH)_2C_6H_3CH_2$ |
| Cl | $CH_2$ | $4-CH_3CONHC_6H_4CH_2$ |
| $CF_3$ | $CH_2$ | $C_6H_5CH_2$ |
| $CF_3$ | $CH(CH_3)$ | p-$FC_6H_4CH_2$ |
| $CH_3$ | $CH_2$ | p-$CH_3OC_6H_4CH_2$ |
| $CH_3$ | $CH_2$ | p-$FC_6H_4CH_2$ |
| $CH_3$ | $CH_2$ | 3-thienyl |
| $CH_3$ | $CH_2$ | 2-furfuryl |
| $CH_3$ | $CH_2$ | Imidazolyl |
| Cl | $CH_2$ | Imidazolyl |
| Cl | $CH_2$ | Benzimidazolyl |
| Cl | $CH_2$ | Furyl |
| Cl | $CH_2$ | $COOCH_3$ |
| Cl | $CH_2$ | $COOCH_2C_6H_5$ |
| Cl | $CH_2$ | $CH_2(CH_2)_4COOC_6H_5$ |
| Cl | $CH_2$ | $C(NH_2)=NH$ |
| $CH_3$ | $CH_2$ | $C(NH_2)=NH$ |
| $CH_3$ | $CH_2$ | $C(NHCH_3)=NH$ |
| $CH_3$ | $CH_2$ | $C(NHC_6H_5)=NH$ |
| Cl | $CH_2$ | $C(NHC_3H_7)=NCH_3$ |
| Cl | $CH_2$ | $C(NHCH_2C_6H_5)=NH$ |
| Cl | $CH_2$ | $C(NHC_6H_5)=NC_6H_5$ |
| Cl | $CH_2$ | $C(NH(CH_2)_4C_6H_5)=NH$ |
| $CH_3$ | $CH_2$ | $CH_2C(NH_2)=NH$ |
| Cl | $CH_2$ | $CH_2(CH_2)_4C(NHCH_3)=NH$ |

The following compounds are prepared by reaction of the corresponding lower alkyl ester with concentrated ammonia, hydrazine, an amine or a substituted hydrazine according to the procedure of Example XXVIII.

| A | Z | R |
|---|---|---|
| CH₃ | CH₂ | CONH₂ |
| NO₂ | CH₂ | CONHCH₃ |
| Cl | CH₂ | CONHNH₂ |
| Cl | CH₂ | CONHCH₂C₆H₅ |
| Cl | CH₂ | CONHNHC₃H₇ |
| Cl | CH₂ | CONHNH(CH₂)₄C₆H₅ |
| Cl | CH₂ | CONHC₆H₅ |
| Cl | CH₂ | CH₂(CH₂)₄CONH₂ |
| Cl | CH₂ | CH₂(CH₂)₄CONHCH₃ |
| Cl | CH₂ | CH₂CH₂CONHNHC₆H₅ |

EXAMPLE XI 3-(chloromethyl)-6-chloro-7-sulfamylbenzothiadiazine-1,1-dioxide

A mixture of 5.5 grams (0.015 mole) of 5-chloro-2,4-disulfamyl (α-chloro)acetanilide and 17 grams (0.15 mole) of 2-chlorpyridine is dissolved in 20 cc. of dimethylformamide to give a homogeneous mixture which is heated on a steam bath for ½ hour. The reaction mixture is then cooled and 75 ml. of saturated aqueous sodium bicarbonate solution then added. After filtration, the aqueous mixture is acidified with dilute hydrochloric acid to obtain 1.6 grams of the product which melts at 328–330° C.

EXAMPLE XII 3-(chloromethyl)-6-chloro-7-sulfamylbenzothiadiazine-1,1-dioxide

A mixture of 3.6 grams (0.01 mole) of 5-chloro-2,4-disulfamyl (α-chloro)acetanilide and 2.42 grams (0.02 mole) of 2,4,6-collidine is added to 10 cc. of dimethylformamide and the mixture allowed to stand at room temperature until homogeneous. After heating for 1 hour on a steam bath, the mixture is evaporated under reduced pressure to a gummy residue which on trituration with dilute hydrochloric acid solidifies. The solid material, 2.2 grams, after filtration and drying, melts at 284–290° C. (d.). The material is purified by dissolving in 25 ml. of 2% sodium bicarbonate, filtering through charcoal and reprecipitating with dilute hydrochloric acid. The recrystallized material melts at 328–330° C.

The procedure of this example is repeated employing the following sterically-hindered tertiary amines; 2,4-lutidine, 2,6-lutidine, 2,4-dichloropyridine, 2-methyl-4-ethylpyridine 2-i-propyl- and 2-n-propylpyridine. Comparable results are obtained.

EXAMPLE XIII 3 grams of 5-chloro-2,4-disulfamyl (α-chloro)acetanilide are heated to the melting temperature (approximately 236° C.) and in approximately 5 minutes the liquified starting compound solidifies to a light tan solid, 2.7 grams being obtained. The product, 3-(chloromethyl)-6-chloro-7-sulfamylbenzothiadiazine-1,1-dioxide is recrystallized by precipitation, from sodium carbonate solution with dilute hydrochloric acid.

EXAMPLE XIV 3-(β-chloroethyl)-6-chloro-7-sulfamylbenzothiadiazine-1,1-dioxide An equimolar mixture of 5-chloro-2,4-disulfamyl(β-chloro)propionanilide and 2-bromopyridine in dimethylformamide is allowed to stand at room temperature until homogeneous. After heating for 1 hour on a steam bath, the mixture is evaporated under reduced pressure to a gummy residue which on trituration with dilute hydrochloric acid solidifies. The solid material after filtration and drying is purified by dissolving in aqueous potassium carbonate, filtered through charcoal and reprecipitated with dilute hydrochloric acid.

EXAMPLE XV

The following 3-(haloalkyl)-6-substituted benzothiadiazine-1,1-dioxides are prepared according to the procedure described in Examples XIII and XIV.

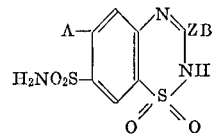

| A | B | Z |
|---|---|---|
| Br | Br | CH₂ |
| F | Cl | (CH₂)₂ |
| CF₃ | F | CH₂ |
| CH₃ | Br | (CH₂)₃ |
| CH₃ | Cl | CH₂ |
| iC₃H₇ | Cl | (CH₂)₃ |
| OC₃H₇ | Cl | (CH₂)₂ |
| NO₂ | Cl | CH₂ |
| Cl | F | (CH₂)₂ |
| CF₃ | I | (CH₂)₂ |
| H | Cl | CH₂ |
| H | Br | CH₂ |
| CH₃ | Br | CH₂ |
| H | Cl | (CH₂)₂ |
| Cl | Cl | CH(CH₃) |
| CH₃ | Cl | CH(CH₃) |
| CF₃ | Cl | CH(CH₃)CH₂ |
| Br | Cl | CH(CH₃) |

The compounds of Table II are converted to various 3,6 - di - substituted - 7 - sulfamyl-1,2,4-benzothiadiazine-1,1-dioxides of this invention by the procedure of Method B, in Example I.

EXAMPLE XVI

A mixture of 2 g. (0.007 mole) of 5-chloro-2,4-disulfamylaniline and 5.0 g. (0.029 mole) of α-chloroacetic anhydride is heated with stirring at 100° C. for two hours. The solid reaction mixture is then triturated in 50 ml. of water after which the mixture is filtered, washed with water and dried to obtain 2.1 g. of 5-chloro-2,4-disulfamyl (α-chloro)acetanilide. The product is crystallized from acetone-ether to obtain a pure sample, m. 235.5–236° C. Elemental analysis gives the following results:

Calculated for C₈H₉O₅N₃Cl₂S₂ (percent): C, 26.53; H, 2.50; N, 11.60. Found (percent): C, 26.41; H, 2.51; N, 11.90.

EXAMPLE XVII

A mixture of 9.3 g. (0.035 mole) of 5-methyl-2,4-disulfamyl aniline and 25 g. (0.15 mole) of α-chloroacetic anhydride is heated at 60° C. After 15 minutes the mixture solidified. Fifty milliliters of chloroform are then added and heating is continued for a total of 3 hours. The mixture is then cooled, filtered and washed with chloroform. The solid residue is then triturated with 50 ml. of water, filtered and recrystallized from acetone after treatment of the hot acetone solution with activated carbon. Eight grams of 5-methyl-2,4-disulfamyl (α-chloro)acetanilide, m. 222°–223° C. (d.), is obtained. Elemental analysis of the product agreed with the calculated value.

EXAMPLE XVIII

A number of 5-substituted-2,4-disulfamyl (halo)acylanilides are prepared according to the procedure of Examples XVI and XVII. The experimental data is summarized in the following table in which is given the products and reactants used.

| 5-substituted-2,4-disulfamyl(halo)acylanilide | 5-substituent of 5-substituted-2,4-disulfamylaniline | Anhydrides | Molar ratio | Reaction Temp. (° C.) | Time (hrs.) |
|---|---|---|---|---|---|
| 5-fluoro-2,4-disulfamyl (α-chloro) propionanilide | Fluoro | α-Chloroacetic | 4:1 | 100 | ½ |
| 5-n-propyl-2,4-disulfamyl (β-bromo) propionanilide | n-Propyl | β-Bromopropionic | 2:1 | 100 | 1 |
| 5-propoxy-2,4-disulfamyl (α-chloro) acetanilide | Propoxy | α-Chloroacetic | 3:1 | 60 | 3 |
| 2,4-disulfamyl (α-chloro) acetanilide | Hydrogen | α-Chloroacetic | 2:1 | 100 | 1 |
| 5-chloro-2,4-disulfamyl (γ-chloro) butyranilide | Chloro | γ-Chlorobutyric | 1:1 | 100 | 1 |
| 5-trifluoromethyl-2,4-disulfamyl (α-chloro) propionanilide | Trifluoromethyl | α-Chloropropionic | 2:1 | 100 | 1 |
| 5-i-propyl-2,4-disulfamyl (α-chloro) acetanilide | i-Propyl | α-Chloroacetic | 4:1 | 100 | ½ |
| 5-chloro 2,4-disulfamyl (β-bromo) propionanilide | Chloro | β-Bromopropionic | 3:1 | 60 | 3 |
| 5-bromo-2,4-disulfamyl (γ-bromo) acetanilide | Bromo | α-Bromoacetic | 4:1 | 60 | 2 |
| 5-nitro-2,4-disulfamyl (γ-bromo) butyranilide | Nitro | γ-Bromobutyric | 3:1 | 100 | 1 |
| 5-methyl-2,4-disulfamyl (β-chloro) propionanilide | Methyl | β-Chloropropionic | 2:1 | 100 | 2 |
| 5-ethyoxy-2,4-disulfamyl (β-bromo) propionanilide | Ethoxy | β-Bromopropionic | 3:1 | 100 | 1 |
| 2,4-disulfamyl (β-bromo) propionanilide | Hydrogen | β-Bromopropionic | 3:1 | 100 | 1 |
| 5-chloro-2,4-disulfamyl (β-chloro) butyranilide | Chloro | γ-chlorobutyric | 2:1 | 100 | 2 |
| 5-methoxy-2,4-disulfamyl (β-chloro) propionanilide | Methoxy | β-Chloropropionic | 3:1 | 60 | 3 |
| 5-bromo-2,4-disulfamyl (β-chloro) butyranilide | Bromo | γ-chlorobutyric | 3:1 | 100 | 1 |
| 5-methyl-2,4-disulfamyl (α-bromo) acetanilide | Methyl | α Bromoacetic | 4:1 | 100 | ½ |
| 5-methoxy-2,4-disulfamyl (α-iodo) acetanilide | Methoxy | α-Iodoacetic | 3:1 | 60 | 3 |
| 5-bromo-2,4-disulfamyl (α-chloro) acetanilide | Bromo | α-Chloroacetic | 4:1 | 100 | ½ |
| 5-nitro-2,4-disulfamyl (α-chloro) acetanilide | Nitro | α-Chloroacetic | 4:1 | 100 | ½ |
| 5-methyl-2,4-disulfamyl (α-chloro) acetanilide | Methyl | α-Chloroacetic | 4:1 | 100 | ½ |
| 5-trifluoromethyl-2,4-disulfamyl (α-chloro) acetanilide | Trifluoromethyl | α-Chloroacetic | 3:1 | 60 | 3 |
| 5-chloro-2,4-disulfamyl (α-fluoro) acetanilide | Chloro | α-Chloroacetic | 2:1 | 100 | 2 |
| 5-methyl 2,4-disulfamyl (β-iodo) propionanilide | Methyl | β-Iodopropionic | 3:1 | 60 | 3 |
| 5-methoxy-2,4-disulfamyl (α-bromo) acetanilide | Methoxy | α-bromoacetic | 4:1 | 100 | ½ |
| 5-nitro-2,4-disulfamyl (β-chloro) propionanilide | Nitro | β-Chloropropionic | 2:1 | 100 | 2 |
| 5-chloro-2,4-disulfamyl (α-fluoro) actanilide | Chloro | α-Fluoroacetic | 4:1 | 100 | ½ |
| 5-fluoro-2,4-disulfamyl (α-fluoro) acetanilide | Fluoro | α-Fluoroacetic | 4:1 | 100 | ½ |

EXAMPLE XIX

5-chloro-2,4-disulfamyl (S-benzyl)thioglycolanilide

To a mixture of 3.6 g. (0.01 mole) of 5-chloro-2,4-disulfamyl (α-chloro)acetanilide and 1.5 g. (0.012 mole) of benzylmercaptan in 7 ml. of dimethylformamide and 3 ml. of water is added 1.0 g. (0.012 mole) of sodium bicarbonate in 5 ml. of water. The mixture is stirred for one hour at room temperature after which it is cooled, diluted with 30 ml. of water and acidified with 6 N HCl. The resulting precipitate is filtered washed and dried, and then recrystallized from methanol to provide the crystalline product, n. 188–190° C. Elemental analysis gives the following results:

Calculated for $C_{15}H_{16}O_5N_3S_3Cl$ (percent): C, 40.0; H, 3.6; N, 9.3. Found (percent): C, 39.9; H, 3.5; N, 9.2.

In a similar manner, other such anilides are prepared from corresponding haloacylanilides and mercaptans and are found in the following table:

TABLE IV

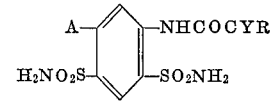

| A | Z | Y | R |
|---|---|---|---|
| Cl | CH₂ | S | Dodecyl |
| Cl | CH₂ | S | CH₂COOH |
| Cl | CH₂ | S | C₂H₅ |
| Cl | CH₂ | S | CH₂CH₂COOH |
| Cl | CH₂ | S | p-CH₃C₆H₄ |
| Cl | CH₂ | S | Allyl |
| Cl | CH₂ | S | C₄H₉ |
| Cl | CH₂ | S | Methallyl |
| CH₃ | CH₂ | S | C₆H₅CH₂ |
| Cl | CH₂ | S | 3-thienyl |
| Cl | CH₂ | S | p-CH₃OC₆H₄CH₂ |
| Cl | CH₂ | S | p-FC₆H₄CH₂ |
| Cl | CH(CH₃) | S | C₆H₅CH₂ |
| Cl | CH₂ | S | 2-furfuryl |
| Cl | CH₂ | S | p-OHC₆H₄CH₂ |
| Cl | CH₂ | SO | C₆H₅CH₂ |
| Cl | CH₂ | SO₂ | C₆H₅CH₂ |
| Cl | CH₂ | S | 3-CH₃O-4-OHC₆H₃CH₂ |
| Cl | CH₂ | S | 4-(CH₃)NC₆H₄CH₂ |
| Cl | CH₂ | S | 2-thenyl |
| Cl | CH₂ | S | 3-thenyl |
| Cl | CH₂ | S | CH₃ |
| Cl | CH₂ | S | C₆H₅(CH₂)₄ |
| F | (CH₂)₂ | S | C₁₂H₂₅ |
| CH₃ | CH₂ | S | C₆H₁₃ |
| n-C₃H₇ | (CH₂)₂ | S | C₄H₉ |
| H | CH₂ | S | C₆H₅CH₂ |
| H | CH₂ | S | CH₃ |
| OC₃H₇ | CH₂ | S | C₆H₅(CH₂)₂ |
| CF₃ | (CH₂)₃ | S | C₆H₅ |
| CF₃ | CH₂ | SO | CH₃C₆H₄ |
| iC₃H₇ | CH₂ | S | C₃H₇C₆H₄ |
| CF₃ | (CH₂)₂ | SO₂ | C₄H₉C₆H₄ |
| Br | CH₂ | S | C₁₀H₇ |
| NO₂ | (CH₂)₃ | S | Allyl |
| CH₃ | (CH₂)₃ | S | Dodecenyl |
| OC₂H₅ | (CH₂)₂ | S | Hexenyl |
| Cl | (CH₂)₃ | SO | Butenyl |
| OCH₃ | (CH₂)₂ | S | (CH₂)₂C₆H₃ |
| Br | (CH₂)₃ | S | CH₃C₆H₄CH₂ |
| CH₃ | CH₂ | S | NO₂C₆H₄ |
| OCH₃ | CH₂ | S | NO₂C₆H₄CH₂ |
| Br | CH₂ | SO | CH₃OC₆H₄ |
| NO₂ | CH₂ | S | BrC₆H₄ |
| NO₂ | CH₂ | SO₂ | ClC₆H₄CH₂ |
| Cl | CH₂ | S | CH₂(CH₂)₄COOH |
| CF₃ | CH₂ | S | CH₂CH₂COOH |
| CF₃ | CH₂ | S | CH₂(CH₂)₄COOCH₃ |
| H | (CH₂)₂ | S | CH₂CH₂COOH |
| Cl | CH₂ | S | CH₂COOC₂H₅ |
| Cl | CH₂ | S | CH₂COOC₃H₇ |
| Br | CH₂ | S | C₃H₇OC₆H₄ |
| CH₃ | CH₂ | S | FC₆H₄(CH₂)₄ |
| Cl | CH₂ | S | NH₂C₆H₄ |
| Cl | CH₂ | S | (CH₃)₂NC₆H₄ |
| Cl | CH₂ | S | NH₂C₆H₄CH₂ |
| Cl | CH₂ | S | C₃H₇NHC₆H₄ |
| CH₃ | CH₂ | S | (C₂H₅)₂NC₆H₄CH₂ |
| CH₃ | CH₂ | S | CH₃NHC₆H₄(CH₂)₄ |
| Cl | CH₂ | SO | Allyl |
| Cl | CH₂ | S | Cyclohexyl |
| Cl | CH₂ | S | Cyclopentyl |
| Cl | CH₂ | S | Cyclobutyl |
| Cl | CH₂ | S | 3-thienyl |
| Cl | CH₂ | S | Thiazolyl |
| Cl | CH₂ | S | Pyrimidyl |
| Cl | CH₂ | S | Pyridyl |
| Br | CH₂ | S | Pyrimidyl |
| Cl | CH₂ | S | Furfuryl |
| Cl | CH₂ | S | Picolyl |
| NO₂ | CH₂ | S | Thienylethyl |
| CH₃ | CH₂ | S | Pyridylpropyl |
| OCH₃ | CH₂ | S | Furylpropyl |
| NO₂ | (CH₂)₃ | S | Thienyl |
| H | (CH₂)₂ | S | Furfuryl |
| Cl | CH(CH₃) | S | Methallyl |
| CH₃ | CH(CH₃) | S | C₆H₅CH₂ |
| CF₃ | CH(CH₃) | SO₂ | Allyl |
| Cl | CH(CH₃)CH₂ | S | C₆H₅CH₂ |
| Cl | CH(C₂H₅) | S | Allyl |
| Cl | CH₂ | S | 2,4-(OH)₂C₆H₃CH₂ |
| Cl | CH₂ | S | 4-CH₃CONHC₆H₄CH₂ |
| CF₃ | CH₂ | S | C₆H₅CH₂ |
| CF₃ | CH(CH₃) | S | p-FC₆H₄CH₂ |
| CH₃ | CH₂ | S | p-CH₃OC₆H₄CH₂ |
| CH₃ | CH₂ | S | p-FC₆H₄CH₂ |
| CH₃ | CH₂ | S | 3-thienyl |
| CH₃ | CH₂ | S | 2-furfuryl |
| CH₂ | CH₂ | S | Imidazolyl |
| Cl | CH₂ | S | Imidazolyl |
| Cl | CH₂ | S | Benzimidazolyl |
| Cl | CH₂ | S | Furyl |
| Cl | CH₂ | S | COOCH₃ |
| Cl | CH₂ | S | COOCH₂C₆H₅ |
| Cl | CH₂ | S | CH₂(CH₂)₄COOC₆H₅ |

The following compounds are prepared by treatment of corresponding 2,4-disulfamyl(halo)acylanilides with a suitable mercaptan (RSH). The reaction is effected by treating the haloacylanilides in aqueous solution containing an equivalent of sodium bicarbonate of the selected mercaptan. For example, equivalent amounts of 5-chloro-2,4 - disulfamyl(α-chloro)acetanilide and sodium bicarbonate are dissolved in aqueous dimethyl formamide to which is added 1 equivalent of thiourea. The reaction mixture is concentrated to obtain the product of the formula:

TABLE 4a $$Cl-C_6H_2(H_2NO_2S)(SO_2NH_2)-NHCOCH_2S-C(NH)(NH_2)$$

| A | Z | R |
|---|---|---|
| CH₃ | CH₂ | C(NH₂)=NH |
| CH₃ | CH₂ | C(NHCH₃)=NH |
| CH₃ | CH₂ | C(NHC₆H₅)=NH |
| Cl | CH₂ | C(NHC₃H₇)=NCH₃ |
| Cl | CH₂ | C(NHCH₂C₆H₅)=NH |
| Cl | CH₂ | C(NHC₆H₅)=NC₆H₅ |
| Cl | CH₂ | C(NH(CH₂)₄C₆H₅)=NH |
| CH₃ | CH₂ | CH₂C(NH₂)=NH |
| Cl | CH₂ | CH₂(CH₂)₄(NHCH₃)=NH |

The following compounds are prepared by reaction of the corresponding lower alkyl ester with concentrated ammonia, hydrazine, an amine or a substituted hydrazine.

TABLE 4b

| A | Z | R |
|---|---|---|
| CH₃ | CH₂ | CONH₂ |
| NO₂ | CH₂ | CONHCH₃ |
| Cl | CH₂ | CONHNH₂ |
| Cl | CH₂ | CONHCH₂C₆H₅ |
| Cl | CH₂ | CONHNHC₃H₇ |
| Cl | CH₂ | CONHNH(CH₂)₄C₆H₅ |
| Cl | CH₂ | CONHC₆H₅ |
| Cl | CH₂ | CH₂(CH₂)₄CONH₂ |
| Cl | CH₂ | CH₂(CH₂)₄CONHCH₃ |
| Cl | CH₂ | CH₂CH₂CONHNHC₆H₅ |

EXAMPLE XX

N-(S-benzylthioglycollyl)-5-chloroaniline-2,4-disulfonyl chloride

A mixture of 5 - chloroaniline-2,4-disulfonyl chloride and S-benzyl-thioglycollyl chloride is allowed to react at room temperature for 18 hours. The product is separated from the mixture and washed with benzene.

In similar fashion, this process is repeated employing various aniline-2,4-disulfonyl halides (Cl, Br, F, I) with suitable acyl halides (Cl, Br, F, I) to form substituted thioacyl aniline-2,4-disulfonyl halides corresponding to the substituted 2,4-disulfamyl thioacylanilides of Table IV. The compounds of this example are converted to those of Example XIX by treatment with liquid ammonia or ammonia in an organic solvent.

EXAMPLE XXI

The hydrochloride of 3-p-aminophenylthiomethyl-6-chloro - 7 - sulfamyl-1,2,4-benzothiadiazine-1,1-dioxide is prepared by dissolving this compound in an aqueous solution containing an equivalent molar amount of hydrochloric acid. The solution is then concentrated under reduced pressure to obtain the corresponding hydrochloride. This procedure is employed in the preparation of other acid salts with hydrobromic acid, hydroiodic acid and sulfuric acid.

The procedure is repeated employing a solution of hydrogen chloride in ethanol with comparable results.

EXAMPLE XXII

The hydrochloride of 3-p-aminophenylthiomethyl-6-chloro-7-sulfamyl-1,2,4-benzothiadiazine - 1,1 - dioxide is dissolved in water to which is then added an equivalent molar amount of silver acetate. The silver chloride precipitate which forms is filtered and the filtrate concentrated under reduced pressure to obtain the acetic acid addition salt.

In a similar manner, the tartaric citric, gluconic and propionic acid addition salts are prepared.

EXAMPLE XXIII

The potassium salt of 3-benzylthiomethyl-6-chloro-7-sulfamyl-1,2,4-benzothiadiazine-1,1-dioxide is prepared by dissolving this compound in an aqueous solution containing an equivalent molar amount of potassium carbonate. The resultant solution is concentrated under reduced pressure to obtain the potassium salt.

This procedure is repeated employing aqueous sodium bicarbonate, barium hydroxide and alcoholic sodium hydroxide to obtain the corresponding metal salts. Similarly, metal salts of the other diuretic agents of this invention are prepared.

EXAMPLE XXIV

A tablet base is prepared by blending the following ingredients in the proportion by weight indicated:

| | |
|---|---|
| Sucrose U.S.P. | 82.0 |
| Tapioca starch | 13.6 |
| Magnesium stearate | 4.4 |

Into this base there is blended a sufficient amount of 3-benzylthiomethyl-6-chloro-7-sulfamyl - 1,2,4-benzothiadiazine-1,1-dioxide to provide tablets containing 100 mg. of active ingredient.

EXAMPLE XXV

Into the tablet base of Example XXIV there is blended a sufficient amount of 3-benzylsulfonylmethyl-6-chloro-7-sulfamyl - 1,2,4 - benzothiadiazine-1,1-dioxide to provide tablets containing 50 mg. of active ingredient.

EXAMPLE XXVI

Into the tablet base of Example XXIV there is incorporated a sufficient amount of 3-benzylthiomethyl-6-chloro-7-sulfamyl-1,2,4-benzothiadiazine-1,1-dioxide to provide tablets each containing 25 mg. of active ingredient.

EXAMPLE XXVII 3-carbamylmethylthiomethyl-6-chloro-7-sulfamyl-1,2,4-benzothiadiazine-1,1-dioxide To 3-carboxymethylthiomethyl-6-chloro-7-sulfamyl-1,2,4-benzothiadiazine-1,1-dioxide (0.02 mole) in 20 ml. of dimethylformamide is added excess phosphorus oxychloride and the mixture stirred until homogeneous. The mixture is heated at 60° C. for one hour after which it is concentrated under reduced pressure. The residue is cooled in an ice bath and treated with concentrated ammonium hydroxide. The excess ammonia is stripped at reduced pressure and the solution acidified with 6 N HCl to obtain the product which is filtered, washed with water, dried and recrystallized from acetone-water.

In similar manner additional amides and hydrazides of Table I are prepared employing $R_1NH_2$, $R_1NHNH_2$ or $NHNH_2$, in lieu of ammonia, with corresponding starting compounds.

EXAMPLE XXVIII 3-benzylcarbamylmethylthiomethyl-6-chloro-7-sulfamyl-1,2,4-benzothiadiazine-1,1-dioxide A mixture of 3-carbethoxymethylthiomethyl-6-chloro-7-sulfamyl-1,2,4-benzothiadiazine-1,1-dioxide (0.03 mole) in 5 ml. of benzylamine is heated with stirring for 2 hours at 120° C. The cooled solid mass is treated with water which is acidified with 6 N HCl to obtain the product which is recrystallized from acetone-water.

What is claimed is:

1. A compound selected from the group consisting of compounds of the formula:

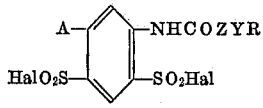

wherein:

A is selected from the group consisting of hydrogen, Cl, F, Br, $NO_2$, $NH_2$, trifluoromethyl, and alkyl and alkoxy each containing from 1 to 3 carbon atoms; Z is alkylene containing 1 to 3 carbon atoms; Y is selected from the group consisting of S, SO and $SO_2$; R is selected from the group consisting of alkyl and alkenyl containing up to 12 carbon atoms; cycloalkyl containing 4 to 6 carbon atoms, naphthyl and

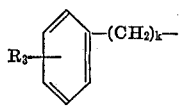

wherein $k$ is an integer from 0 to 4 and $R_3$ is selected from the group consisting of hydrogen, amino, lower alkylamino, nitro, fluoro, chloro, bromo, lower alkyl and lower alkoxy.

2. The compound of claim 1 wherein A is chloro, Z contains one carbon atom in the principal chain and up to a total of three carbon atoms, Y is S and R is

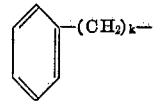

wherein $k$ is an integer from 1 to 4.

3. The compound of claim 2 wherein Z is methylene and $k$ is 1.

4. The compound of claim 3 wherein Hal is chlorine.

5. The compound of claim 1 wherein A is chloro, Z contains one carbon atom in the principal chain and up to a total of three carbon atoms, Y is S and R is alkenyl containing up to 5 carbon atoms.

6. The compound of claim 5 wherein Z is methylene and R is allyl.

7. The compound of claim 6 wherein Hal is chlorine.

References Cited

UNITED STATES PATENTS 2,809,194    10/1957    Novello _____ 260—243

LORRAINE A. WEINBERGER, Primary Examiner

E. J. GLEIMAN, Assistant Examiner